United States Patent
Oteri et al.

(10) Patent No.: US 12,207,304 B2
(45) Date of Patent: Jan. 21, 2025

(54) FULL DUPLEX OPPORTUNITY DISCOVERY AND TRANSMISSION FOR ASYMMETRIC FULL DUPLEX WIRELESS LOCAL AREA NETWORKS (WLANS)

(71) Applicant: InterDigital Patent Holdings, Inc., Wilmington, DE (US)

(72) Inventors: Oghenekome Oteri, San Diego, CA (US); Guodong Zhang, Woodbury, NY (US); Li-Hsiang Sun, San Diego, CA (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/373,117

(22) Filed: Sep. 26, 2023

(65) Prior Publication Data
US 2024/0023166 A1   Jan. 18, 2024

Related U.S. Application Data

(63) Continuation of application No. 17/943,864, filed on Sep. 13, 2022, now Pat. No. 11,770,854, which is a
(Continued)

(51) Int. Cl.
*H04L 5/14* (2006.01)
*H04W 24/10* (2009.01)
(Continued)

(52) U.S. Cl.
CPC .......... *H04W 74/0816* (2013.01); *H04L 5/14* (2013.01); *H04W 24/10* (2013.01); *H04W 84/12* (2013.01)

(58) Field of Classification Search
CPC .............................. H04W 72/12; H04W 84/12
(Continued)

(56) References Cited

U.S. PATENT DOCUMENTS 8,305,948 B2   11/2012   Surineni et al.
9,788,317 B2   10/2017   Ghosh et al.
(Continued)

OTHER PUBLICATIONS

Banerjea et al., "A Simplified Simultaneous Transmit and Receive MAC Proposal," IEEE 802.11-14/0340-00hew (Mar. 17, 2014).
(Continued)

*Primary Examiner* — Angel T Brockman
(74) *Attorney, Agent, or Firm* — VOLPE KOENIG

(57) ABSTRACT

Methods and apparatuses are described herein for full-duplex transmission opportunity discovery and transmission in a wireless 802.11 network. A station (STA) may receive a transmission opportunity (TxOP) setup frame from an access point (AP), the TxOP setup frame including information enabling the STA to transmit a first measurement frame and another STA to transmit a second measurement frame. The STA may transmit the first measurement frame to the other STA, receive the second measurement frame from the other STA, and transmit feedback to the AP based on the received second measurement frame. The STA may receive, based on the feedback, a trigger frame from the AP to communicate during a TxOP and receive, during the TxOP, downlink data from the AP.

20 Claims, 13 Drawing Sheets

Related U.S. Application Data continuation of application No. 17/052,642, filed as application No. PCT/US2019/030659 on May 3, 2019, now Pat. No. 11,445,545.

(60) Provisional application No. 62/666,523, filed on May 3, 2018.

(51) Int. Cl.
*H04W 74/0816* (2024.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 10,085,168 B2 | 9/2018 | Grandhi |
| 10,291,380 B2 | 5/2019 | Fang et al. |
| 10,616,886 B2 | 4/2020 | Marinier |
| 2005/0135318 A1 | 6/2005 | Walton et al. |
| 2006/0062181 A1 | 3/2006 | Chou |
| 2009/0028074 A1 | 1/2009 | Knox |
| 2013/0301551 A1 | 11/2013 | Ghosh et al. |
| 2013/0301569 A1 | 11/2013 | Wang et al. |
| 2015/0078215 A1 | 3/2015 | Zhou et al. |
| 2015/0172038 A1 | 6/2015 | Jiang et al. |
| 2016/0174206 A1 | 6/2016 | Xia et al. |
| 2017/0180103 A1 | 6/2017 | Min et al. |
| 2017/0310386 A1 | 10/2017 | Liu et al. |
| 2018/0041917 A1 | 2/2018 | Xi et al. |
| 2018/0091283 A1 | 3/2018 | Wang et al. |
| 2018/0091284 A1 | 3/2018 | Min et al. |
| 2023/0007691 A1* | 1/2023 | Oteri .................... H04L 5/0048 |

OTHER PUBLICATIONS

Bharadia et al., "Full Duplex Radios," SIGCOMM (Aug. 12-16, 2013).
Bian et al., "Co-time Co-frequency Full Duplex for 802.11 WLAN," IEEE 802.11-13/0765r2 (Jul. 17, 2013).
Bourdoux et al., "Full-duplex Technology for Hew," IEEE 11-13/0764r1 (Jul. 14, 2013).
Duarte et al., "Design and Characterization of a Full-duplex Multi-antenna System for WiFi networks," arXiv:1210.1639 (Oct. 2012).
Gilb et al., "802.11 Full Duplex," IEEE 802.11-18/0191r0 (Jan. 15, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Jain et al., "Practical, Real-time, Full Duplex Wireless," MobiCom (Sep. 19-23, 2011).
Ji et al., "The Research on Solutions for OBSS Interference Problems in MU-MIMO Transmission Based on VHT WLANs," Journal of Signal Processing, No. 01 (Jan. 25, 2013).
Kim et al., "Janus: A Novel MAC Protocol for Full Duplex Radio," CSTR 2013-02 (Jul. 23, 2013).
Levis, "STR Radios and STR Media Access," IEEE 802.11-13/1421r1 (Nov. 12, 2013).
Oteri et al., "FD Architecture in 802.11," IEEE 802.11-18/1224r1 (Jul. 5, 2018).
Oteri et al., "Technical Report on Full Duplex for 802.11—FD Architecture," 802.11/18-1225r1 (Jul. 2018).
Singh et al., "Efficient and Fair MAC for Wireless Networks with Self-Interference Cancellation," International Symposium of Modeling and Optimization of Mobile, Ad Hoc, and Wireless Networks, pp. 94-101 (May 2011).
Srinivasan et al., "Beyond Full Duplex Wireless," Asilomar Conference on Signals, Systems and Computers (Nov. 2012).
Taori et al., "Considerations for In-Band Simultaneous Transmit and Receive (STR) feature in HEW," IEEE 11-13/1122r1 (Sep. 16, 2013).
Xin et al., "Technical Report on Full Duplex for 802.11," IEEE 802.11/18-0498r2 (Aug. 2018).

* cited by examiner

FULL DUPLEX OPPORTUNITY DISCOVERY AND TRANSMISSION FOR ASYMMETRIC FULL DUPLEX WIRELESS LOCAL AREA NETWORKS (WLANS)

CROSS-REFERENCE TO RELATED APPLICATIONS

This application is a continuation of U.S. patent application Ser. No. 17/943,864 filed Sep. 13, 2022, which issued as U.S. Pat. No. 11,770,854 on Sep. 26, 2023, which is a continuation of U.S. patent application Ser. No. 17/052,642 filed Nov. 3, 2020, which issued as U.S. Pat. No. 11,445,545 on Sep. 13, 2022, which is the U.S. National Stage, under 35 U.S.C. § 371, of International Application No. PCT/US2019/030659 filed May 3, 2019, which claims the benefit of U.S. Provisional Application No. 62/666,523, filed May 3, 2018, the contents of which are incorporated herein by reference.

BACKGROUND

Conventional wireless communications systems are typically restricted to transmission/reception using any combination of time/frequency/space/polarization dimensions to separate downlink from uplink transmissions. This restriction is imposed by the state of the art in radio technology, which, due to limitations in isolation capabilities of hardware, has necessitated that a radio on a particular frequency band only either transmit or receive at a particular time instant. In practice, this may be accommodated using either Frequency Division Duplex (FDD), or Time Division Duplex (TDD) transmission schemes wherein as noted, separation of transmitted and received signals are accomplished using either frequency or time. Due to advances in self-interference cancelation techniques (both hardware and software) in recent years, the feasibility of full-duplex at the physical layer has been demonstrated. However, at a given device, interference from a primary transmission may hinder the reception of a secondary transmission from another device. Thus, it would be desirable to have a full-duplex opportunity discovery mechanism and corresponding full-duplex transmission set up procedures.

SUMMARY

Methods and apparatuses are described herein for full-duplex transmission opportunity discovery and transmission in a wireless 802.11 network. A station (STA) may receive a transmission opportunity (TxOP) setup frame from an access point (AP), the TxOP setup frame including information enabling the STA to transmit a first measurement frame and another STA to transmit a second measurement frame. The STA may transmit the first measurement frame to the other STA, receive the second measurement frame from the other STA, and transmit feedback to the AP based on the received second measurement frame. The STA may receive, based on the feedback, a trigger frame from the AP to communicate during a TxOP and receive, during the TxOP, downlink data from the AP.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
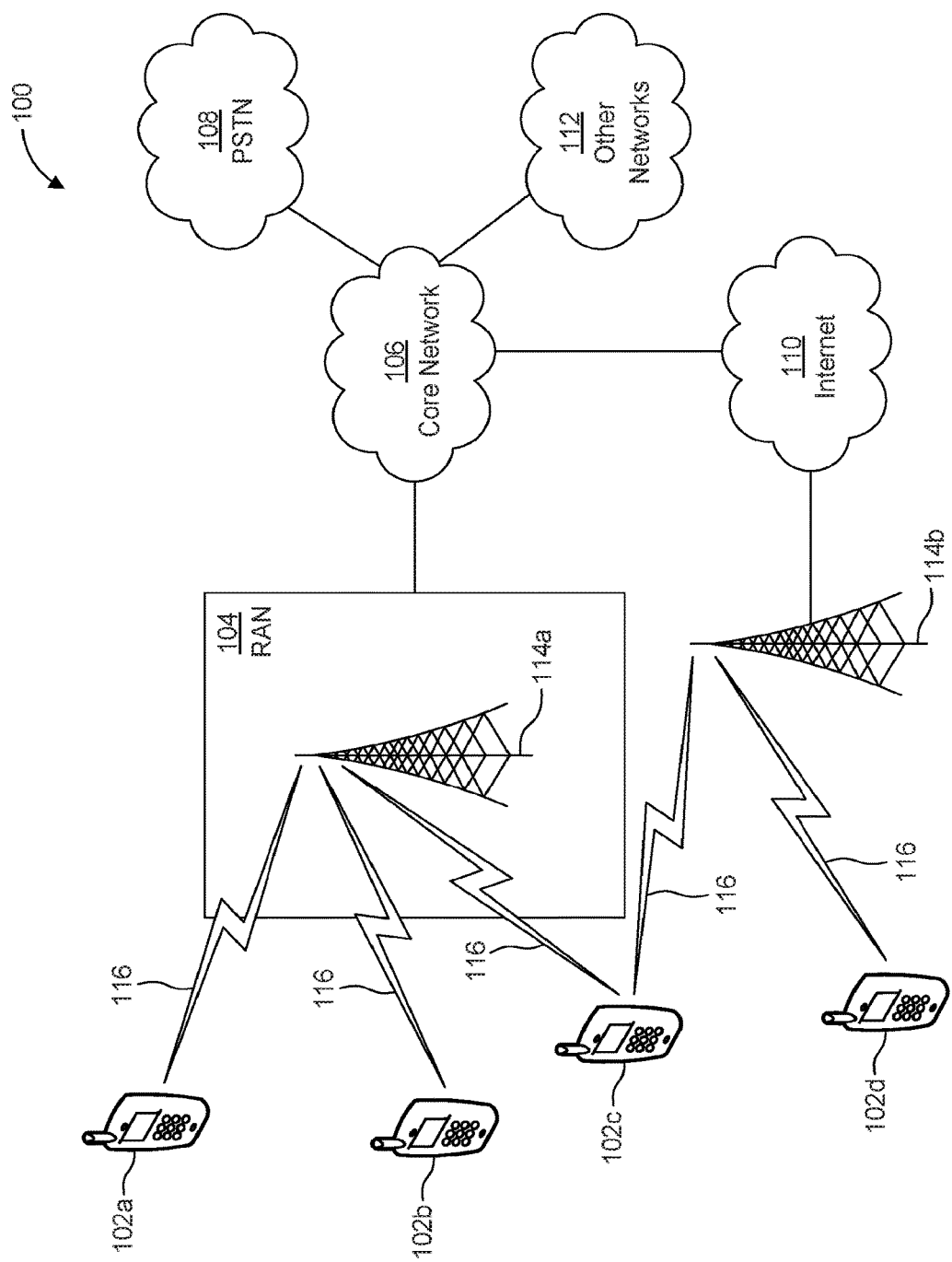
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the VVTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA2000, WiMAX, E-UTRA, or WiFi radio technology.

The CN 106/115 may also serve as a gateway for the VVTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the VVTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
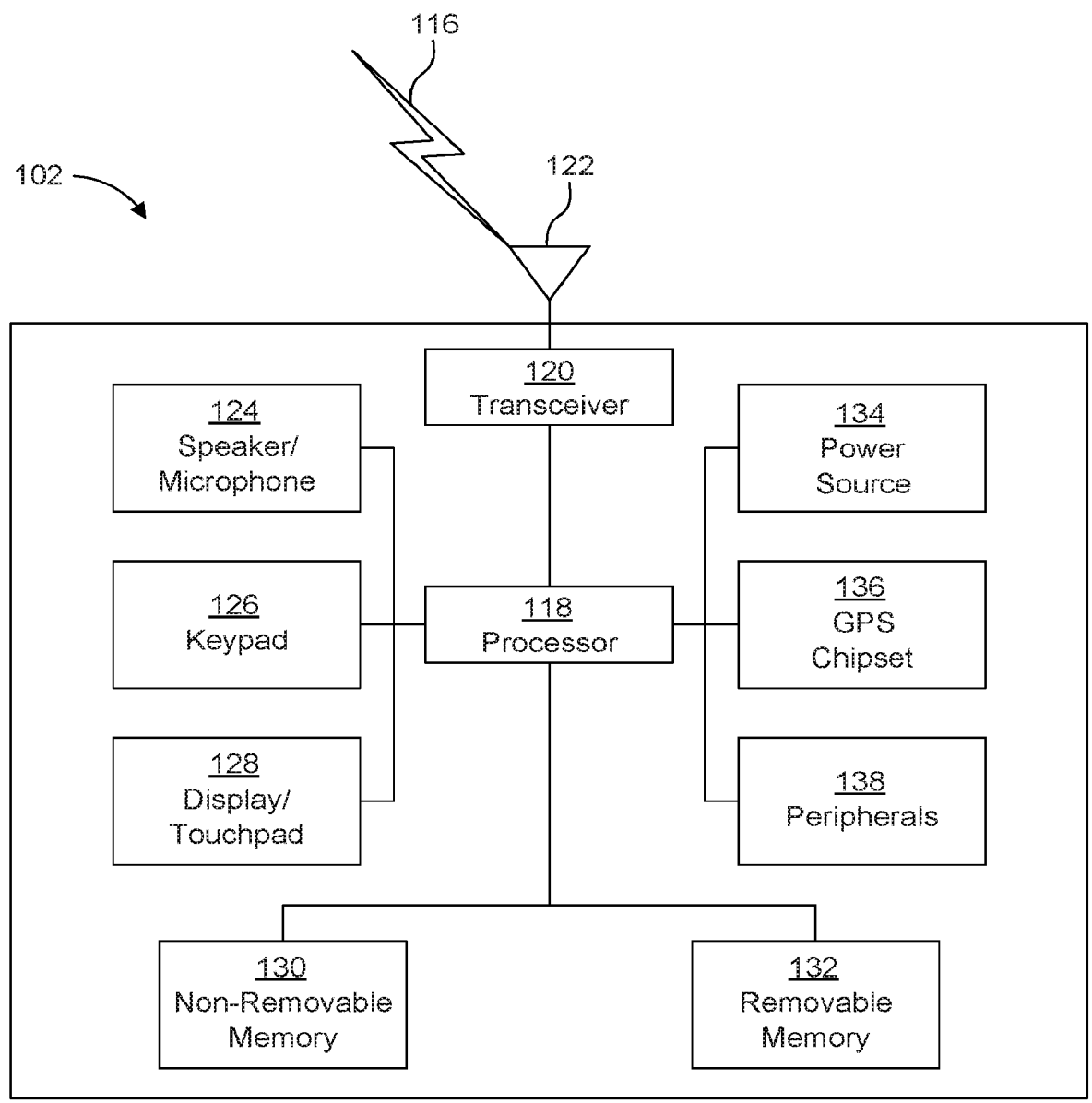
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full-duplex radio for which transmission and reception of some or all of the signals (e.g., associated with particular subframes for both the UL (e.g., for transmission) and downlink (e.g., for reception) may be concurrent and/or simultaneous. The full-duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
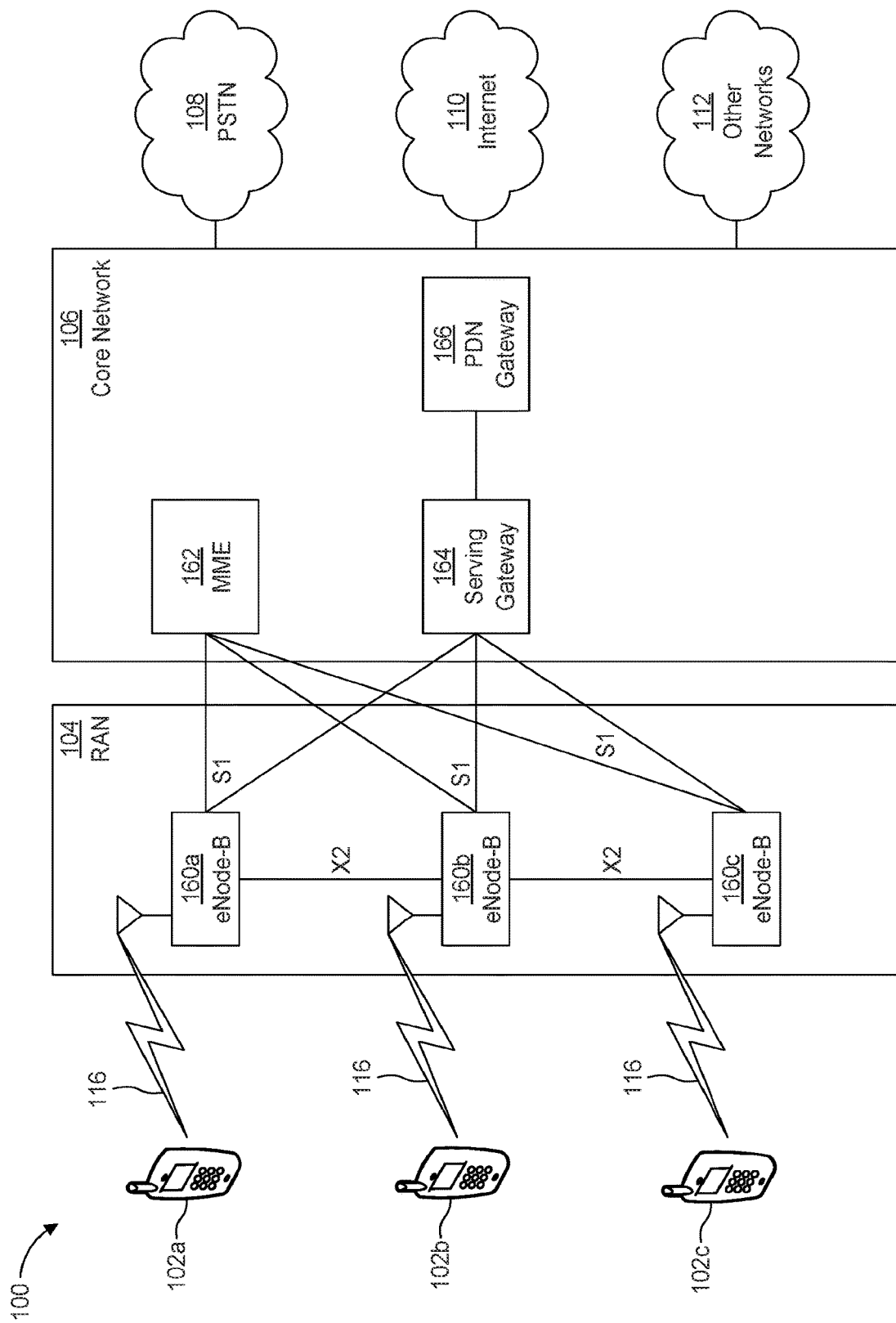
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the VVTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
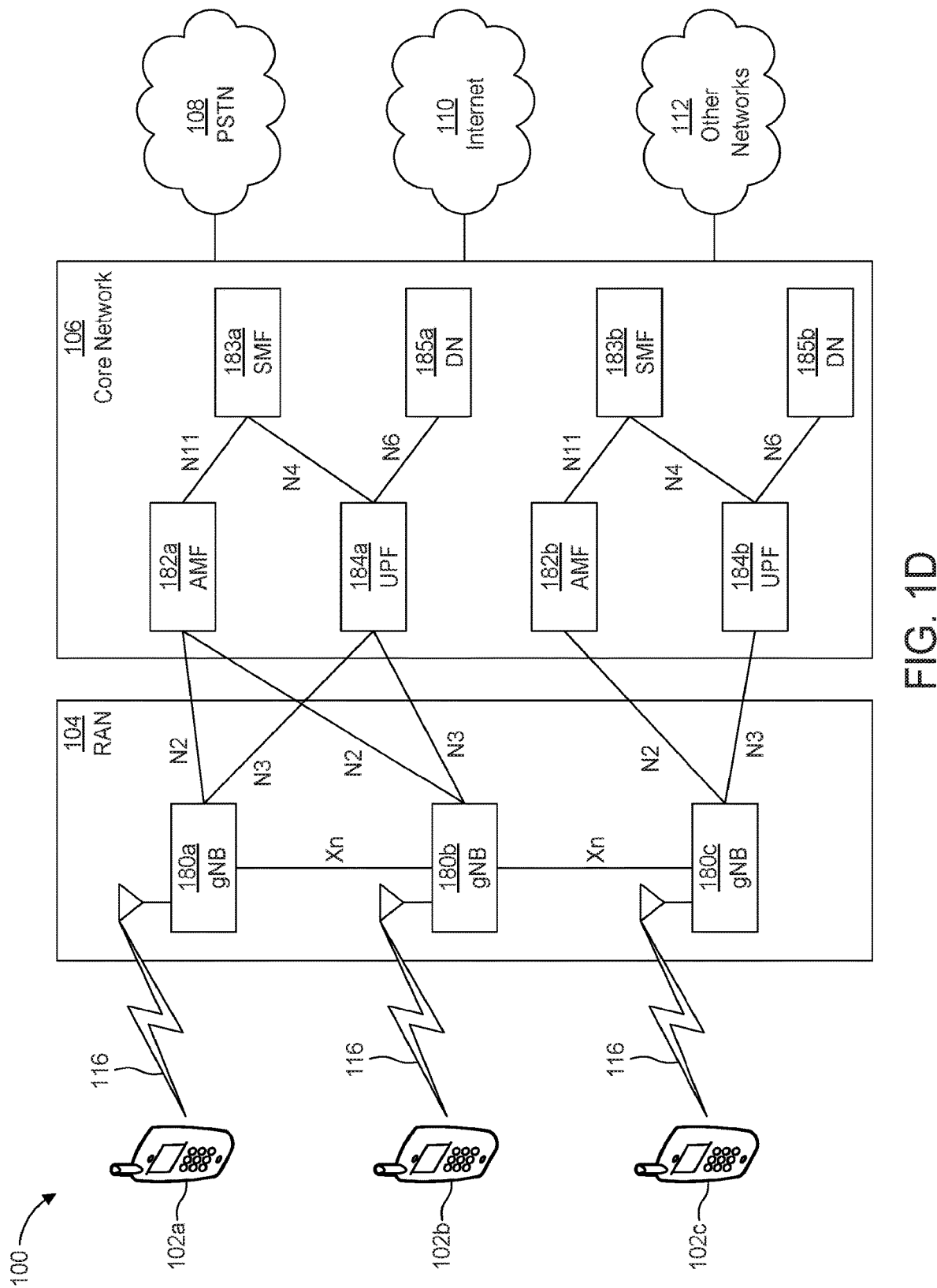
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the VVTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the VVTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the VVTRUs 102a, 102b, 102c with access to the other networks 112, which may include other wired and/or wireless networks that are owned and/or operated by other service providers. In one embodiment, the VVTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
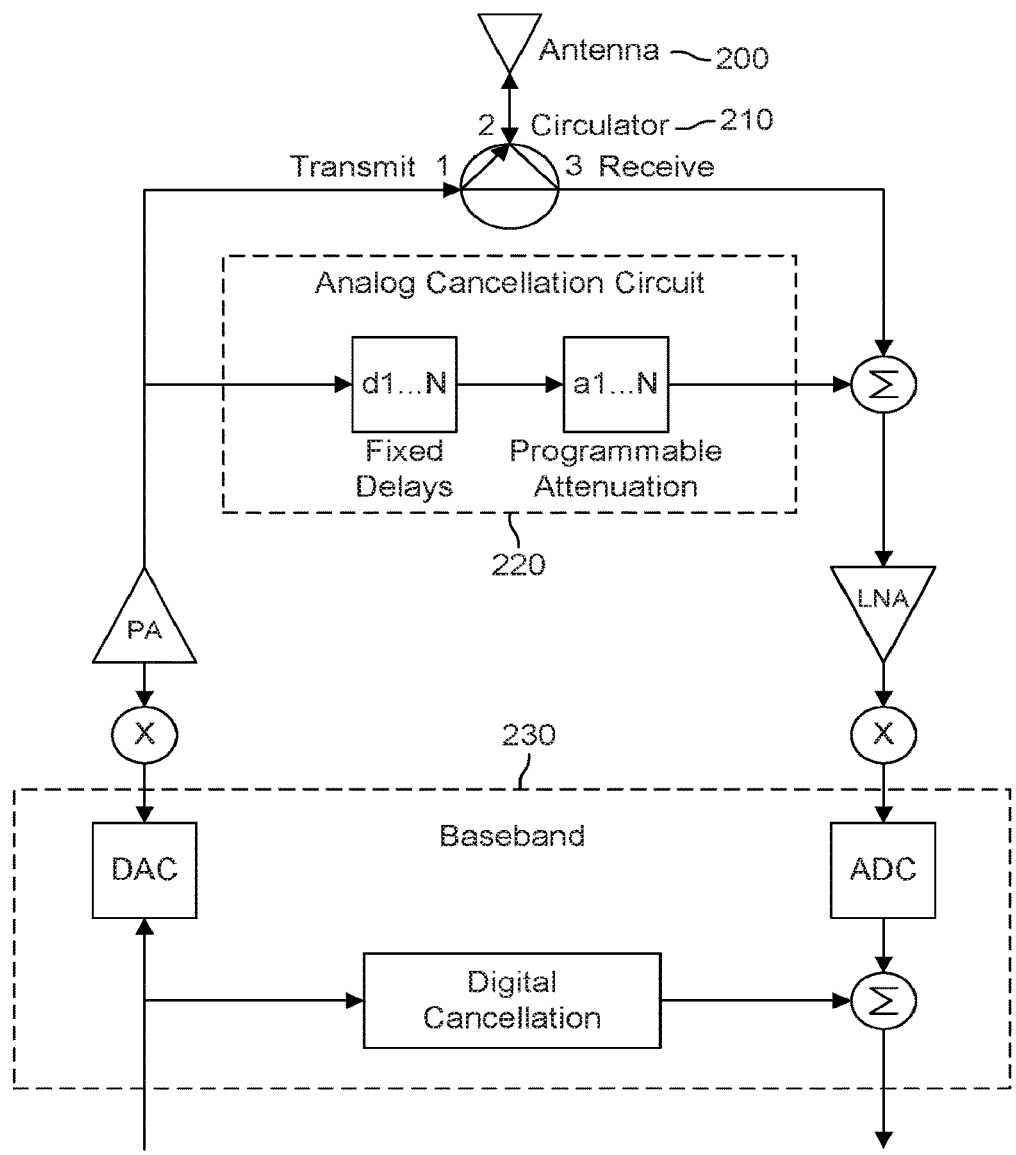
FIG. 2 is a block diagram illustrating an example full-duplex transceiver.

FIG. 2 illustrates an example full-duplex transceiver, which may be used in any combination of other embodiments described herein. FIG. 2 provides an overview of an example full-duplex wireless (FDW) wireless transmit/receive unit (WTRU). As illustrated in FIG. 2, an FDW WTRU may comprise at least three functional hardware/software groupings: (1) antenna isolation; (2) analog cancellation; and (3) digital cancellation. It may be noted that each of these functions aim to provide a specific degree of transmission and reception isolation/cancellation with a unique set of design constraints and limitations.

The antenna isolation function may provide 25 to 40 dB of isolation between transmit and receive signal paths. The analog cancellation function may provide an additional 25 to 30 dB of isolation. Lastly, the digital cancellation function may provide a further 10 to 25 dB of isolation. Using the combination of these functions, an FDW WTRU may provide up to 80 dB of isolation between the transmit and receive signal paths. This may be considered to be the minimum necessary for a practical FDW WTRU.

Still referring to FIG. 2, to facilitate full-duplex transmission (that is to say, simultaneous transmission and reception), the first step may be antenna isolation of the transmit and receive antennas (shown collectively as antenna 200). Isolation may be accomplished using a number of different approaches such as physical alignment, location, phase cancellation, isolation using a circulator, or the like. FIG. 2 shows a circulator 210, but this is exemplary and one skilled in the art will recognize that multiple ways of achieving antenna isolation may be used here. Using these methods for antenna isolation may approximately provide 30 dB of isolation.

Still referring to FIG. 2, the analog cancellation function may address interference that is created by the transmit path that affects the receive path. This may be accomplished through the use of a cancellation signal that is applied to the receive signal. Examples of analog cancellation may include, but are not limited to: (1) use of a balun for coupling of a portion of the transmit signal and inverted prior to cancellation in the receive path; (2) use of an analog cancellation circuit to actively adjust the cancellation signal; and (3) use of a branch line coupler to facilitate analog cancellation. FIG. 2 shows an analog cancellation circuit 220 that is configured to perform any and/or all of the above mentioned procedures to achieve analog cancelation. Of course, one skilled in the art will also recognize other analog cancelation techniques may be performed by the analog cancellation circuit 220.

Still referring to FIG. 2, the digital cancellation function 230 may be used to remove residual interference in the receive signal after the antenna isolation function and analog cancellation function. As described above, digital cancellation may provide 10 to 25 dB of isolation. However, this may not be sufficient without other elements of signal cancellation. The consequence of quantization limitations for broadband digital converter technologies may be one reason it is difficult to achieve a higher degree of digital cancellation.

The digital cancellation function may include two components: circuitry configured to estimate the self-interference of the received waveform, and circuitry configured to use the channel estimate on the known transmit signal to generate digital reference samples for subtraction from the received signal. Since the quality of digital cancellation may depend on the quality of channel estimation, if the FDW WTRU is implemented in a WLAN system, channel estimation may be particularly prone to interference due to other WTRUs that cause interference during the training period of the reception. A potential solution to this problem is the use an interference-free period for channel estimation via a carrier sense mechanism.

In order to implement a FDW WTRU, a full-duplex medium access control (MAC) design that supports full-duplex operation in WLAN networks is needed. There may be two types of full-duplex operations: pair-wise (symmetric) full-duplex and asymmetric full-duplex.

Figure 3:
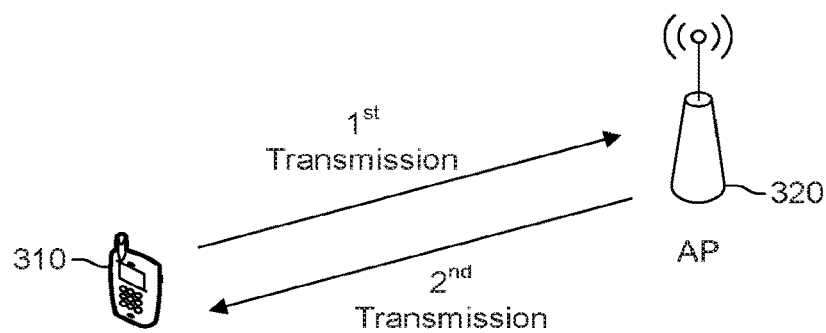
FIG. 3 is a diagram illustrating an example pair-wise full-duplex operation.

FIG. 3 illustrates an example pair-wise full-duplex operation, which may be used in any combination of other embodiments described herein. As illustrated in FIG. 3, in the pair-wise full-duplex scenario, there may be two WTRUs involved in the full-duplex operation. Both nodes (as illustrated in FIG. 3, WTRU 310 and access point (AP) 320) are full-duplex capable (that is, FDW WTRUs) and may transmit and receive at the same time.

Figure 4:
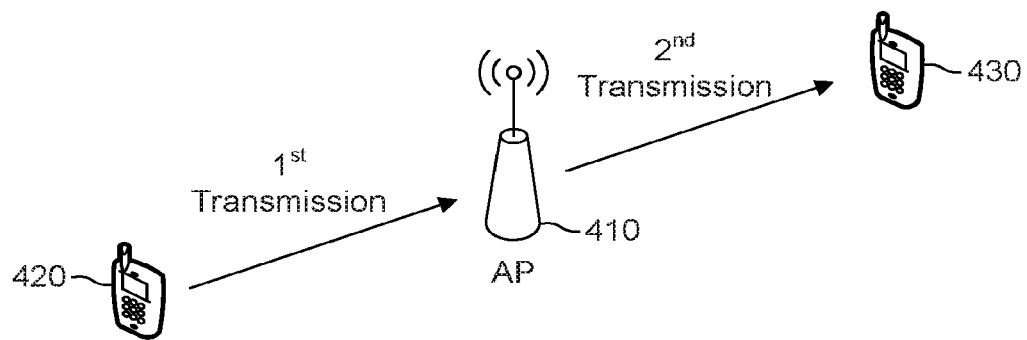
FIG. 4 is a diagram illustrating an example asymmetric full-duplex operation.

FIG. 4 illustrates an example asymmetric full-duplex operation, which may be used in any combination of other embodiments described herein. As illustrated in FIG. 4, in the asymmetric full-duplex scenario, there may be three WTRUs involved in the full-duplex operation. The AP 410 may be full-duplex capable since it is the WTRU that is transmitting and receiving at the same time. The other two WTRUs (WTRU 420 and WTRU 430) may be half-duplex capable or full-duplex capable.

As illustrated in FIGS. 3 and 4, the first transmission in the full-duplex operation may be defined as the primary transmission. The corresponding transmitter and receiver of the primary transmission may be defined as the primary transmitter and the primary receiver. The second transmission may be defined as the secondary transmission of the full-duplex operation. The corresponding transmitter and receiver of the secondary transmission may be defined as the secondary transmitter and the secondary receiver.

Examples of a MAC design features for full-duplex operation may include, but are not limited to: (1) a carrier sense multiple access/collision avoidance (CSMA/CA)-based algorithm; (2) a protocol that supports pair-wise and unrestricted simultaneous transmit and receive (STR) scenarios; (3) modification of current acknowledgment (ACK) schemes (e.g., specifying the order of sending ACKs after full-duplex transmission); (4) at the addition of the idea of a secondary transmission (e.g., determining the destination of the secondary transmission based on history-based interfering table); (5) a primary transmission collision mechanism (e.g., using secondary transmission as an implicit ACK); (6) a requirement that all nodes be simultaneous transmit and receive (STR)-aware; and (7) no support for legacy IEEE 802.11 devices.

Other examples of MAC design features for full-duplex operation may include, but are not limited to: (1) permitting only a pair-wise STR scenario; (2) requiring modification of current ACK scheme to modify the priority of sending ACKs to be higher than waiting for ACKs; (3) requiring modification of current overhearing behavior (e.g., after one successful full-duplex transmission, every node may wait for EIFS to start next contention); (4) a pairwise secondary transmission scheme (e.g., embedding the initiation of secondary transmission in a ready to send-clear to send (RTS-CTS) exchange); and (5) compatible with existing IEEE 802.11 devices with higher contention overhead (such as EIFS).

Other examples of MAC design features for full-duplex operation may include, but are not limited to: (1) AP-centralized algorithms; (2) supporting pair-wise and unrestricted STR scenarios; (3) requiring a centralized medium access mechanism; (4) requiring all nodes to be STR-aware;

and (5) no support legacy 802.11 devices. The centralized medium access mechanism may be controlled by an AP and operated in a 3-step cycle. For example, at a first step, the AP may collect information about data-length and interference relationships from VVTRUs. At a second step, the AP may broadcast the scheduling decision packet and initiate data transmissions. At a third step, the WTRUs may send ACKs in a predefined order embedded in the scheduling decision packet.

In order to maximize spectrum utilization, in-band full-duplex may be considered for IEEE 802.11ax. Examples of high level designs for in-band full-duplex MAC may include, but are not limited to: (1) adding an STR preamble to support in-band full-duplex; (2) including a partial association identifier (AID) in the very high throughput signal A1 (VHT-SIGA1) field indicating a recipient of PPDU; (3) group ID/partial AID of a second WTRU indicating that the second WTRU should also transmit; (4) requirement that a second WTRU end PPDU transmission before the L_LENGTH duration; (5) in band STR capable AP that can transmit and receive ACK simultaneously; and (6) a WTRU sending feedback of the WTRU transmit buffer status to an AP to assist the AP in scheduling UL transmissions.

Figure 5:
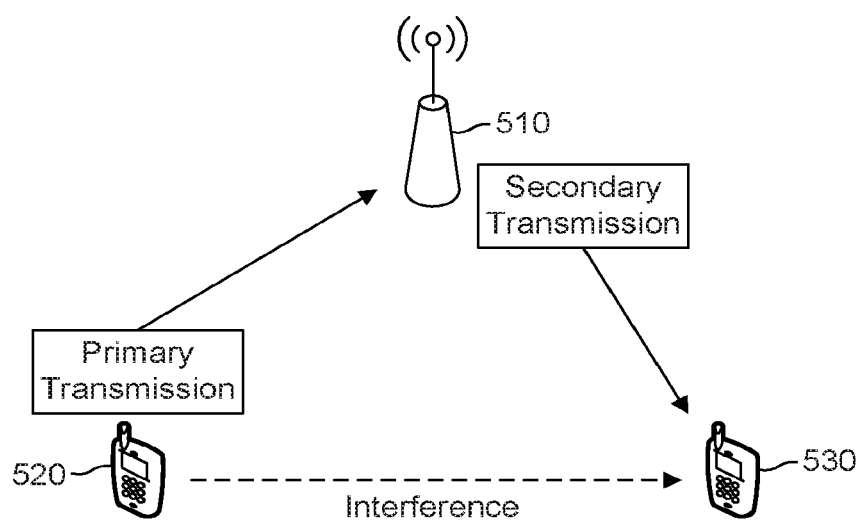
FIG. 5 is a diagram illustrating an example interference in full-duplex operation.

FIG. 5 illustrates an example of interference that may exist in full-duplex operation. As illustrated in the asymmetric full-duplex operation in FIG. 5, the AP 510 may receive a primary transmission from a first WTRU 520 while simultaneously transmitting a secondary transmission to a second WTRU 530. AP 510 performs self-interference cancellation so that it can receive the primary transmission while simultaneously transmitting the secondary transmission. However, interference from the primary transmission may hinder the reception of the secondary transmission by the second WTRU 530. Thus, in order to support full-duplex operation in WLAN, it is desirable to design a full-duplex opportunity discovery mechanism and corresponding full-duplex transmission set up procedure such that the transmitter (WTRU) of a primary transmission will not cause interference to a receiver (WTRU) of a secondary transmission.

The solutions detailed below may be implemented in a WTRU or an AP, and may include, but are not limited to: (1) a full-duplex compatibility discovery procedure; (2) a full-duplex transmit opportunity (TXOP) based on wireless medium sensing before a trigger frame with possible backward compatibility to downlink WTRUs; (3) a full-duplex transmit opportunity (TXOP) with possible backward compatibility to both uplink/downlink legacy WTRUs; and (4) broadcasting a RTS/CTS/negative CTS (NCTS).

The full-duplex compatibility discovery procedure ensures that there is no interference between WTRUs, however the uplink and downlink WTRUs may need to be carefully selected and the transmit power used by the AP may need to be carefully estimated. In one embodiment, WTRUs are selected to limit interference based on an exhaustive identification procedure that pairs the WTRUs that may transmit/receive together (i.e. to identify the WTRUs that may be transmitted to using full-duplex (FD) while they are receiving from a different WTRU). This may be referred to as forward FD compatibility (i.e. the ability of WTRU A to send a frame in the uplink to the AP while the AP sends a frame to a different WTRU B in the downlink with the interference at WTRU B less than a threshold).

There may also be a need to identify reverse FD compatibility, in which WTRU B offers less interference than a threshold to WTRU A. It should be noted that the reverse FD compatibility may have a different threshold from the forward FD compatibility. In one example, the reverse direction may tolerate more interference in the case that the reverse FD transmission is needed to support FD ACKs as they may be sent with a lower modulation and coding scheme (MCS) or higher coding rate. It should also be noted that forward and reverse incompatibility may be defined in which WTRUs that may not transmit/receive together are identified.

The FD compatibility discovery procedure may comprise a measurement phase and a reporting phase. In the measurement phase, an AP may send an FD_discovery setup frame to a WTRU or a group of WTRUs initiating the discovery procedure. The FD_discovery setup frame may include one or more of the identification of WTRU(s), interference threshold(s), indication of whether to identify compatible or incompatible WTRUs, the number of WTRUs, or other setup parameters. The identification of WTRUs may be used to perform the procedure. Examples of identification may include, but are not limited to, the WTRU identifier (for example, STA ID), the list of WTRU identifiers (STA IDs) or group IDs of the WTRUs. The interference threshold(s) may be used to identify FD compatible or FD incompatible WTRUs. In one example, the threshold(s) may be AP configurable or fixed. In another example, the threshold(s) may be WTRU specific or common for all WTRUs. In another example, the threshold(s) may be the same or differ for the forward and reverse FD compatibility measurements. The number of WTRUs may be used to identify in the forward compatibility scenario. For example, each WTRU may be asked to identify a fixed number of the best WTRUs.

Each WTRU signaled in the FD_discovery setup frame may send out an FD measurement frame. For example, quality of service (QoS) null or a specialized frame that contains the transmit power used by the WTRU may be transmitted. The WTRUs may send out the frames in a pre-determined order. For example, the WTRUs may send out the frames based on the order determined in the FD_discovery setup frame.

The FD discovery phase may use beamforming and/or power control to limit the amount of interference. In the measurement phase, each transmitting WTRU may send out frames directed to maximize the energy of the received signal at the AP. In one example, the WTRU transmitting a discovery frame may use beamformed or sectorized antennas to limit the amount of interference experienced by other WTRUs. In the measurement phase, each WTRU that is not transmitting a discovery frame may modify its receive antenna to minimize energy from all WTRUs apart from the AP, for example, using beamformed or sectorized antennas, to limit the amount of interference received from other WTRUs. The transmitting WTRU may also send (e.g., only) the amount of transmit power needed to enable successful decoding of the packet to limit the amount of interference to other WTRUs.

All other WTRUs may measure the amount of interference received from each transmitting WTRU and determine its compatibility by comparing received signal strength with the threshold. If an indication of the transmit power is included in the transmitted frame, the WTRU may be able to determine the reverse FD compatibility by estimating the receive power at the originating WTRU if it has to transmit to the WTRU. A WTRU B may also be able to send the AP feedback regarding the transmit power that WTRU A may be able to use (or the difference in power) to ensure FD compatibility.

In the reporting phase, each WTRU may send a list of compatible or incompatible WTRUs to the AP. In one example, the AP may poll each WTRU (e.g. WTRU B) to request its list (e.g., one or more of the forward or reverse FD (in)compatible WTRUs). In another example, the AP may send out an NDP feedback request to multiple WTRUs and request the WTRUs to feedback their lists using OFDMA. For each WTRU on the list (e.g. WTRU A), the feedback may include a WTRU identifier. For example, the WTRU identifier includes the WTRU ID or the index of the WTRU in the FD_discovery setup request (e.g., the first WTRU sending out its measurement frame is identified as WTRU0, the second is identified as WTRU1, and so on). For each WTRU on the list (e.g., WTRU A), the feedback may include a power value (or power difference) that may be used by that WTRU (WTRU A) to ensure FD compatibility with the WTRU feeding back the list. The AP may relay this information to the WTRU (WTRU A) when the WTRU is scheduled for uplink transmission with WTRU B that is scheduled for downlink transmission. The WTRU (e.g., WTRU A) may overhear this information during the feedback from WTRU B.

Figure 6:
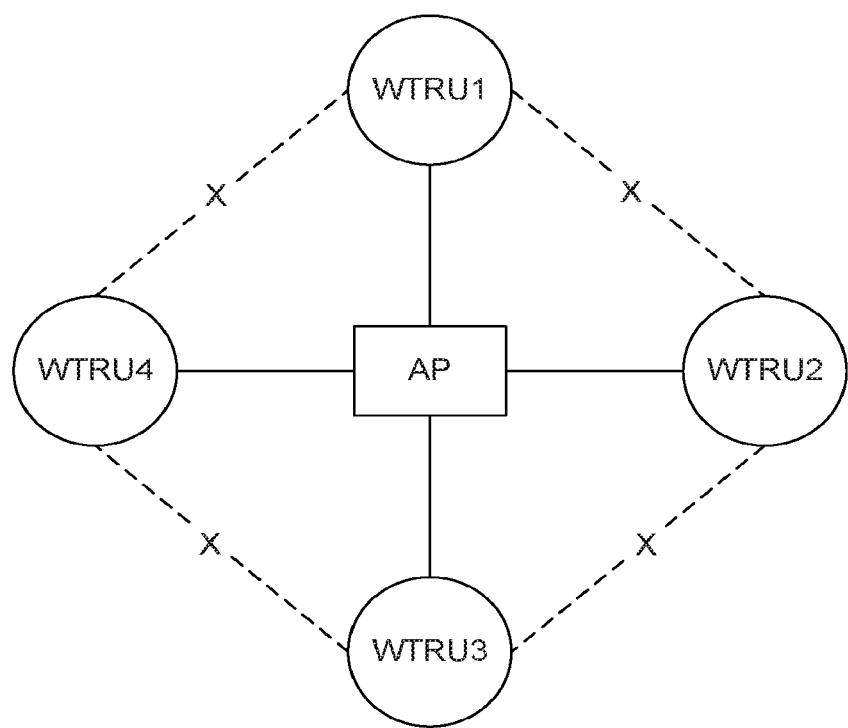
FIG. 6 is a diagram illustrating an example wireless network with an access point (AP) showing full-duplex compatibility between VVTRUs.

FIG. 6 illustrates an example wireless network with a FD AP showing full-duplex compatibility between stations (WTRUs). The FD compatibility of the WTRUs is shown in Table 1, below. WTRUs linked by an X in the connection oath are not FD compatible on that link.

Figure 7:
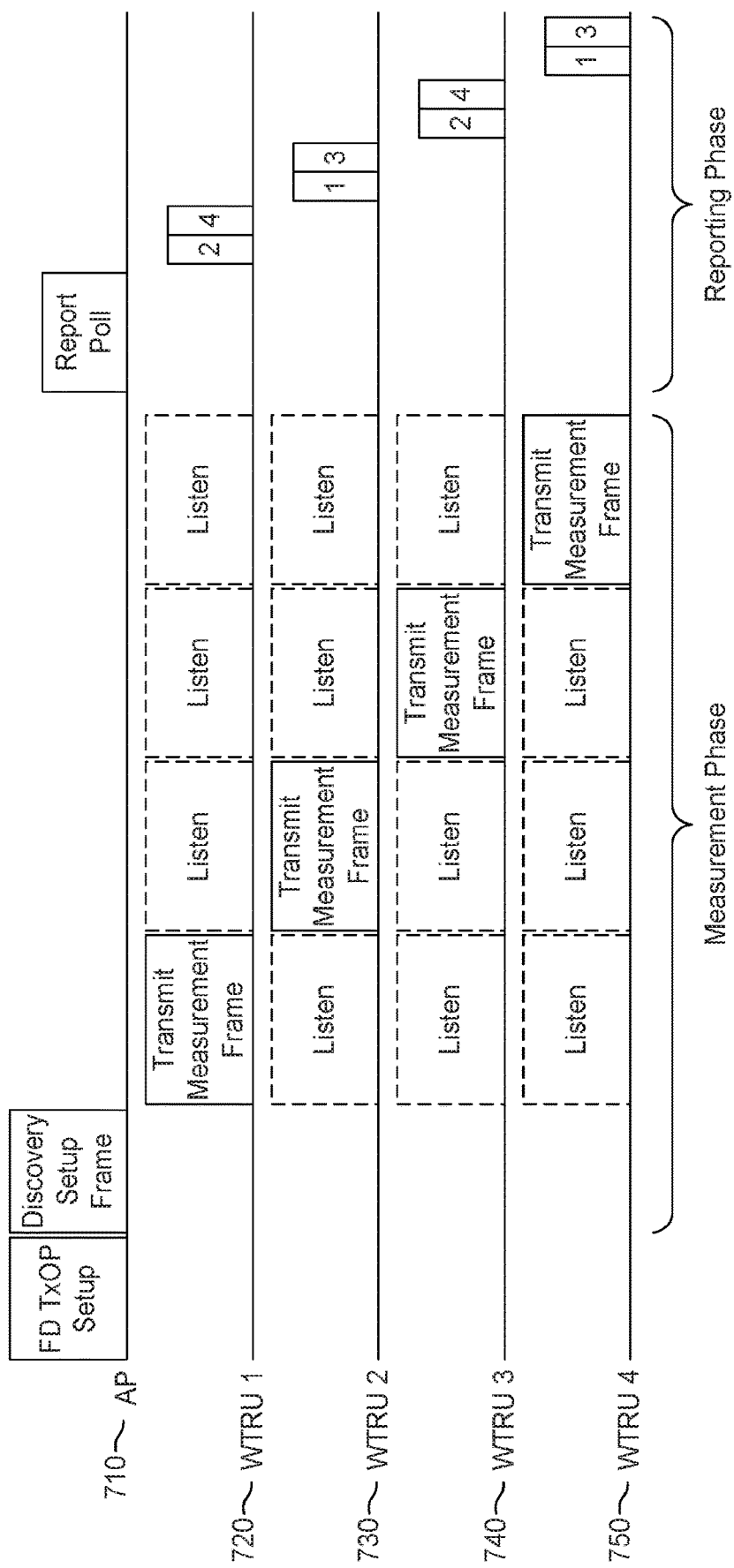
FIG. 7 is a diagram illustrating an example full-duplex compatibility discovery procedure with polling in reporting phase.

FIG. 7 illustrates an example full-duplex compatibility discovery procedure with polling in reporting phase, which may be used in any combination of other embodiments described herein. Specifically, an AP 710 transmits an FD TxOP setup frame followed by a discovery setup frame. In some embodiments, these two frames may be combined, or one may be omitted altogether. Each of WTRU1, 720, WTRU2, 730, WTRU3, 740, and WTRU4, 750 transmits a measurement frame. While each individual WTRU transmits a measurement frame, each of the other WTRUs listens during the measurement frame transmission. So, for example, based on information contained in the discovery setup frame, WTRU1 720 transmits a first measurement frame. Each of WTRU2 730, WTRU3 740, and WTRU4 750 listens during the time period in which WTRU1 720 transmits the measurement frame. Each of WTRU2 730, WTRU3 740, and WTRU4 750 performs a measurement on the measurement frame transmitted by WTRU1 720 if that respective WTRU indeed receives the measurement frame. The process then repeats for each WTRU. This is the measurement phase.

In the reporting phase, in this embodiment, the AP 710 transmits a Report Poll frame, and each WTRU reports its measurement results in turn. So, in this example, WTRU1, 720, will report back its measurements regarding the other WTRUs that it can sense, in this case WTRU2, 730, and WTRU4, 750. Similarly, each of WTRU2, 730, WTRU3, 740, and WTRU4, 750, report their measurement results in turn.

Figure 8:
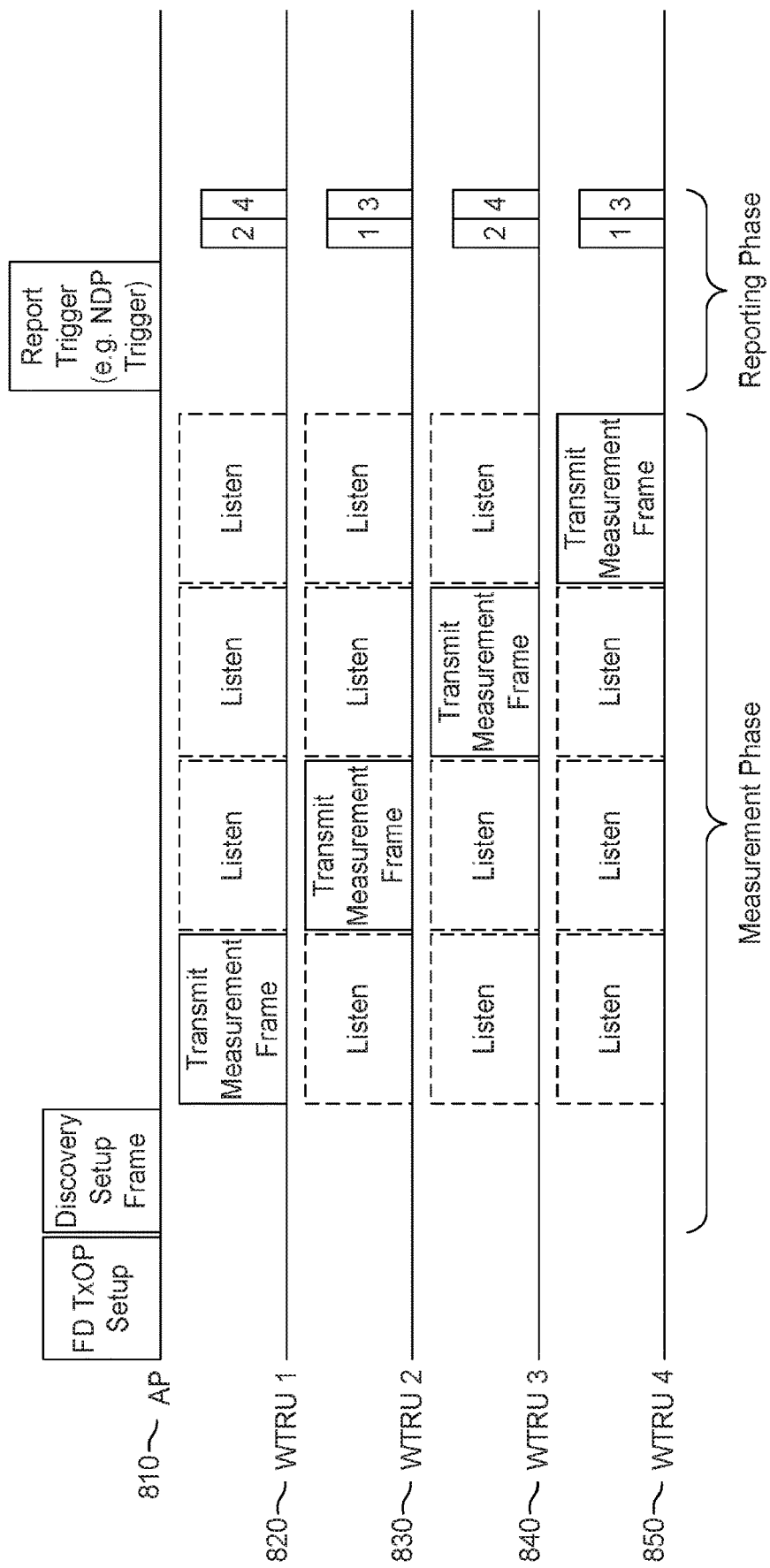
FIG. 8 is a diagram illustrating an example full-duplex compatibility discovery procedure with null data packet (NDP) report trigger in reporting phase.

FIG. 8 illustrates an example full-duplex compatibility discovery procedure with a null data packet (NDP) report trigger in a reporting phase followed by reporting by the WTRU using MU transmission, which may be used in any combination of other embodiments described herein. This embodiment is similar to the one described above with reference to FIG. 7, except here, the reporting phase is accomplished by the WTRUs using MU transmissions (i.e. at the same time).

TABLE 1

| FD Compatibility | | | | |
|---|---|---|---|---|
| | STA 1 | STA 2 | STA 3 | STA 4 |
| STA 1 | N/A | Not FD compatible | FD compatible | Not FD compatible |
| STA 2 | Not FD compatible | N/A | Not FD compatible | FD compatible |
| STA 3 | FD compatible | Not FD compatible | N/A | Not FD compatible |
| STA 4 | Not FD compatible | FD compatible | Not FD compatible | N/A |

Figure 9:
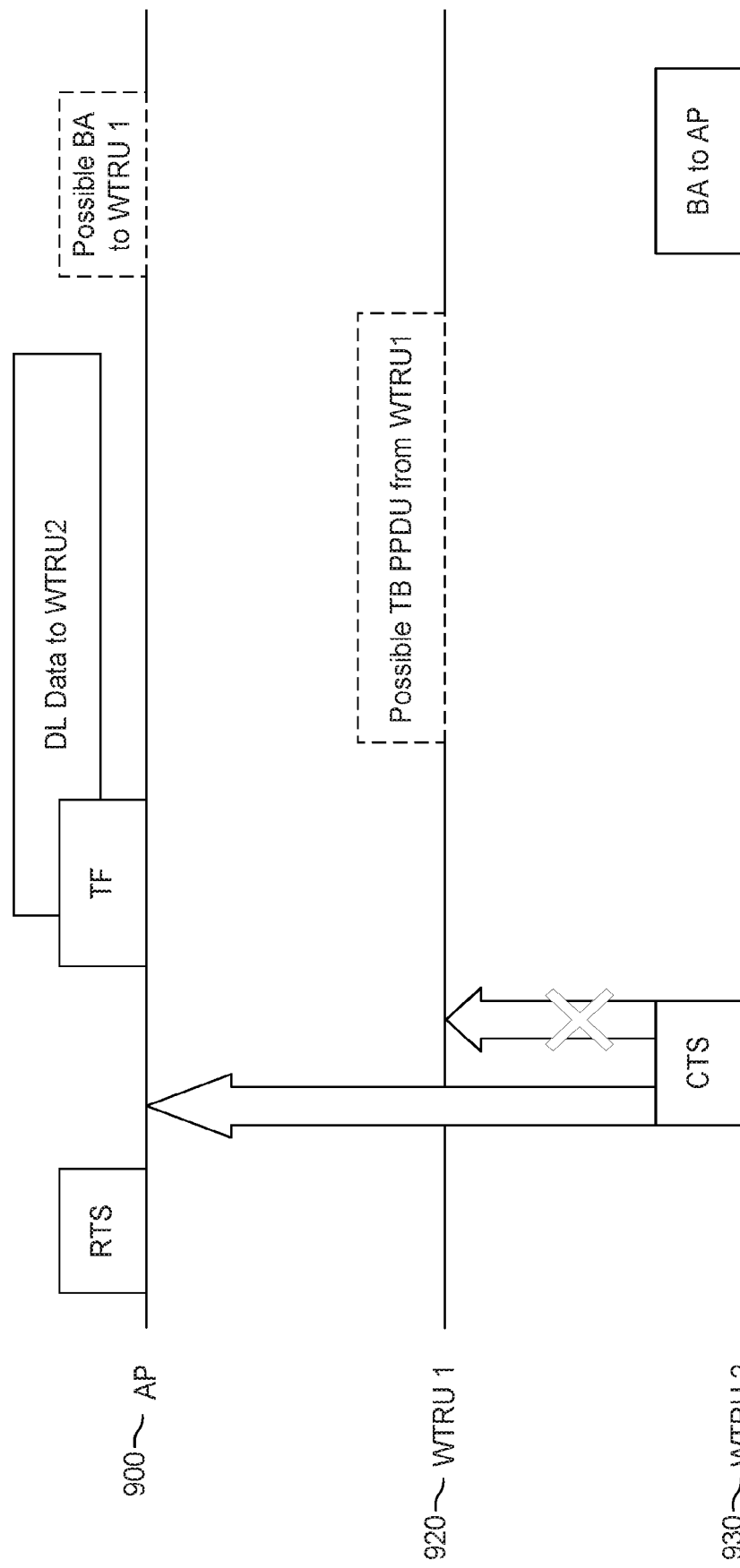
FIG. 9 is a diagram illustrating an example full-duplex transmit opportunity (TXOP) based on medium sensing before a trigger frame, with possible backward compatibility to downlink (DL) stations.

FIG. 9 illustrates an example full-duplex transmit opportunity (FD TXOP) based on wireless medium sensing before a trigger frame with possible backward compatibility to downlink (DL) stations, which may be used in any combination of other embodiments described herein. To avoid interference from the primary transmitter that may hinder the reception of the secondary transmission, the transmission of UL can be based on carrier sensing before receipt of a trigger frame from the AP, as illustrated in FIG. 9. For example, AP 910 will perform a full-duplex TXOP by sending a request-to-send (RTS) frame to one or more DL WTRUs (e.g., WTRU1 920 and WTRU2 930). The RTS frame may be a multi-user (MU) request-to-send (MU-RTS). The WTRUs addressed by the RTS/MU-RTS may be the WTRUs that the AP wishes to perform DL transmission to. The WTRUs addressed by the RTS/MU-RTS may respond with a clear-to-send (CTS) frame/simultaneous CTS frame. The AP may then schedule a trigger frame (TF) addressed to one or more UL WTRUs (e.g., WTRU1 920) an interframe spacing (IFS) (e.g. a short IFS, SIFS) after the end of the (expected) CTS frame transmission.

The UL WTRUs may determine, based on the medium busy status of duration T before the reception of the TF, possibly with additional sensing of the medium busy status an IFS after the TF, whether to perform UL TB PPDU transmission scheduled by the TF. The sensing before the TF may be referred to as a CTS test. For example, if WTRU1 920 has received a CTS frame from WTRU2 930, or the medium is sensed busy T before the TF, WTRU1 920 may not perform a TB PPDU transmission. The AP 910 may configure UL WTRUs to perform a CCA/CTS procedure in a beamformed antenna pattern instead of an omni-directional setup. The same beamformed antenna pattern may be used for UL TB PPDU transmission. Based on channel reciprocity and the CTS procedure, if WTRU1 920 cannot receive from WTRU2 920, WTRU1 920's UL transmission does not interfere with WTRU2 930's reception.

Still referring to FIG. 9, the AP 910 may perform DL data transmission at the same time or after the TF transmission. The AP 910 may receive UL TB PPDUs while simultaneously transmitting DL data. If the AP 910 receives the TB PPDU from WTRU1 920, it may perform DL acknowledgement/block acknowledgement/multiple block acknowledgement (ACK/BA/MBA) transmission. The DL WTRUs may perform UL ACK/BA at the same time. The UL WTRUs' (e.g. WTRU1 920) reception of BA from AP 910 may not be interfered with UL ACK/BA. This may be based on the CTS test such that WTRU1 920 cannot receive from WTRU2 930.

In the embodiment described above, the DL WTRU (e.g., WTRU2 930) may be a legacy WTRU. The TF may be sent with DL data in a DL MU PPDU with either MU-MIMO or OFDMA. In the MU-PPDU, padding may or may not applied after the TF (e.g., for ensuring the same PPDU duration for all receivers). The AP 910 may not require the UL WTRU (e.g., WTRU1 920) to perform carrier sensing a SIFS interval after the TF. The TF may be sent with DL data in separate PPDUs with a SIFS separation (i.e. TF+SIFS+DL PPDU). The AP 910 may require UL WTRUs (e.g., WTRU1 920) to perform carrier sensing a SIFS after the TF. The RTS/MU-RTS in the above embodiment may be another message that triggers a response from the DL WTRU(s). The CTS in the above embodiment may be another message that responds to a triggering message from the AP. The information of the TF may be included in the MU-RTS frame such that the legacy WTRU would not decode this additional information. In this case, the TB PPDU transmission may be an IFS (e.g., SIFS) after the end of the expected CTS frame, if CTS procedure is successful in acquiring the medium. The TF may be multiplexed with a MU-RTS frame in a DL MU PPDU (e.g., MU-MIMO of OFDMA). In this case, the TB PPDU transmission may be an IFS (e.g., SIFS) after the end of the expect CTS frame, if the CTS procedure is successful.

Figure 10:
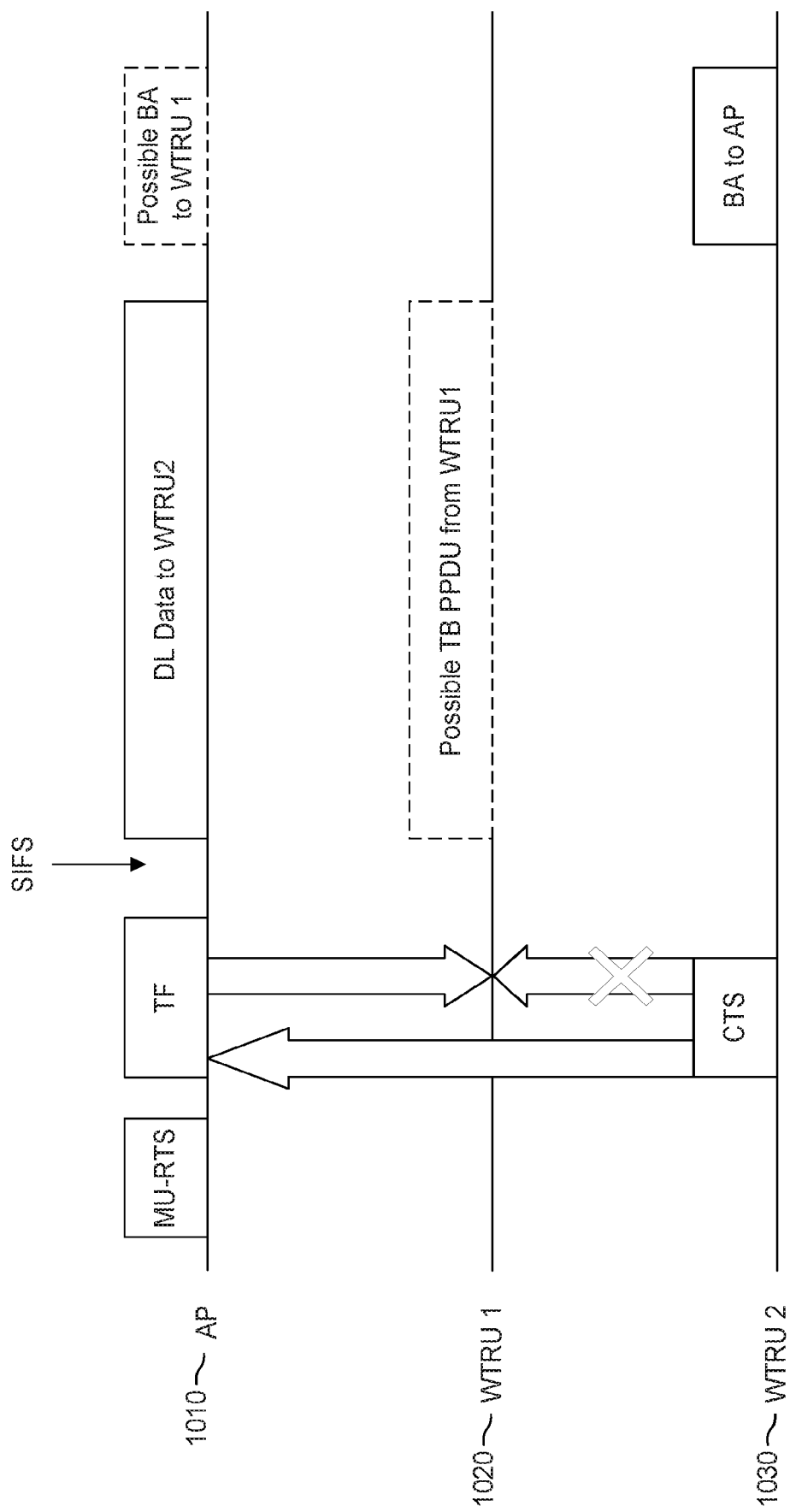
FIG. 10 is a diagram illustrating an example full-duplex transmit opportunity (TXOP) with possible backward compatibility to both uplink/downlink (UL/DL) stations.

FIG. 10 illustrates an example full-duplex transmit opportunity (TXOP) with possible backward compatibility to both uplink/downlink (UL/DL) stations, which may be used in any combination with other embodiments described herein. In the scenario where full-duplex capable (or full-duplex aware) devices and legacy devices co-exist in a BSS, it is reasonable to expect full-duplex operation should not negatively impact the operation and performance of the legacy devices. To avoid interference from the primary transmitter that may hinder the reception of a secondary transmission, with the possibility of backwards compatibility, the transmission UL frames can be based on the reception status of a trigger frame from the AP, as illustrated in FIG. 10.

For example, an AP 1010 wishing to perform a full-duplex TXOP may send a MU-RTS to one or more DL WTRUs (e.g., WTRU2 1030). WTRUs addressed by the MU-RTS transmitted by the AP 1010 may respond with a CTS frame/simultaneous CTS frames. The AP 1010 may start transmitting a TF at or after the start of the (expected) CTS frame, such that the TF overlaps in time with the (expected) CTS frame and the TF ends at same time or after the end of the (expected) CTS frame. The AP 1010 may send the TF with a higher modulation and coding scheme (MCS) than that of the MU-RTS or the received CTS, such that the minimum receive sensitivity of the TF is increased for ensuring a collision of TF at an UL WTRU (e.g., WTRU1 1020) if interference from a CTS frame from DL STAs (e.g., WTRU2 1030) is experienced. The TF may have MAC or PHY padding such that it ends at or after the end of the (expected) CTS frame.

The UL WTRUs may determine, based on the correct reception of the TF, with possible additional sensing of the medium busy status an IFS after the TF, whether to perform UL TB PPDU transmission scheduled by the TF. The correct reception of the TF may be interchangeably referred to as a TF collision test. For example, if WTRU1 1020 has correctly received the TF, possibly with a certain signal-to-noise ratio (SNR) above a threshold, WTRU1 1020 may perform a TB PPDU transmission. Otherwise, WTRU1 1020 may not perform the transmission of a TB PPDU. The AP 1010 may configure UL WTRUs to perform TF reception in a beamformed antenna pattern instead of an omni-directional arrangement. The same beamformed antenna pattern may be used for UL TB PPDU transmission. Based on channel reciprocity and the TF collision test, if WTRU1 1020's DL reception is not interfered by WTRU2 1030, WTRU1 1020's UL transmission does not interfere with WTRU2 1030's DL reception.

The AP 1010 may perform DL data transmission an IFS (e.g., SIFS) after the TF transmission. The AP 1010 may receive an UL TB PPDU. The DL data transmission may not need to be a SIFS interval after the reception of a CTS because for MU-RTS there is no network allocation vector (NAV) reset. If the AP 1010 receives the TB PPDU, it may perform DL ACK/BA/MBA transmission. The DL WTRUs may perform UL ACK/BA at the same time. The UL WTRUs' (e.g., WTRU1 1020) reception of a BA from the AP 1010 may not interfere with an UL ACK/BA. This may be based on the TF collision test such that WTRU 1 1020 does not experience interference from WTRU2 1030.

In the embodiment described above, the DL WTRUs (e.g., WTRU2 1030) may be legacy WTRUs. The UL WTRUs (e.g., WTRU1 1020) may also be legacy WTRUs. The AP 1010 may require the UL WTRUs (e.g., WTRU1 1020) to perform carrier sensing a SIFS after the TF. The RTS/MU-RTS in the above embodiment may be another message that triggers a response from DL WTRU(s). The CTS in the above embodiment may be another message that responds to a triggering message from the AP.

Figure 11:
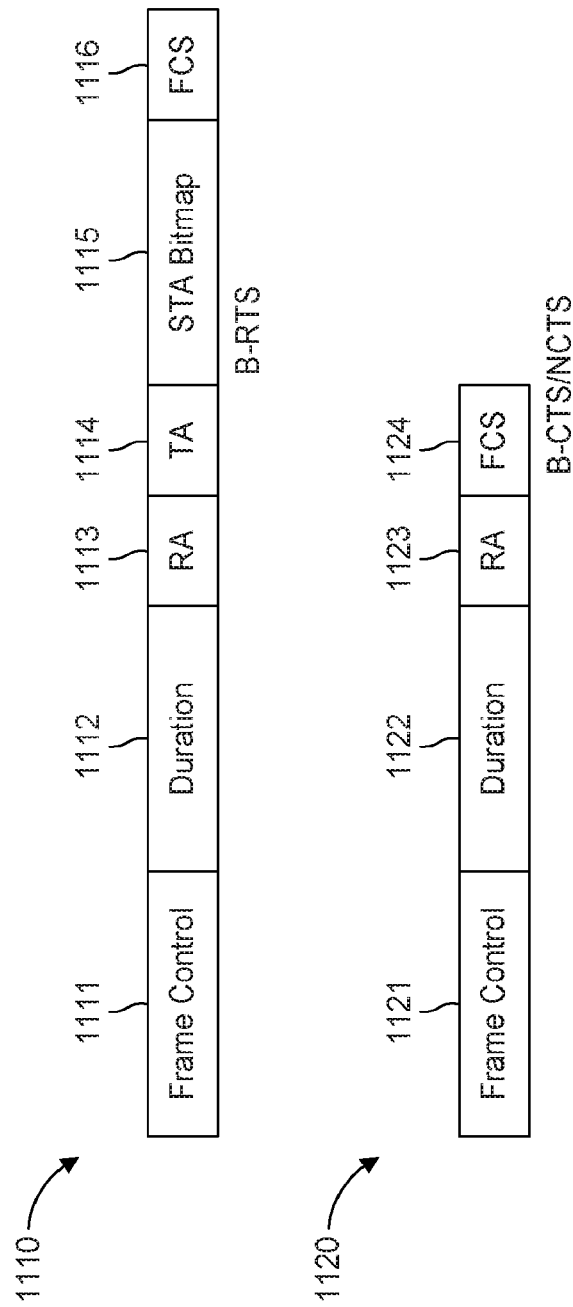
FIG. 11 is a diagram illustrating an example frame structure for broadcast request-to-send/clear-to-send/negative-clear-to-send (B-RTS/CTS/NCTS)

FIG. 11 illustrates example frame structures for a broadcast request-to-send (B-RTS) frame 1110 and also a broadcast clear-to-send/negative-clear-to-send (B-CTS/NCTS) frame 1120. To avoid interference to a second WTRU's receiver, a multicast/broadcast RTS/CTS and negative-CTS (NCTS) protocol may be used to manage the behavior of the second WTRU's receiver during the transmission period of the first WTRU with the AP. In an example, it may be assumed that there is a group of WTRUs defined for full-duplex operation with the AP. It may also be assumed that a group of legacy WTRUs is associated with an AP which supports full-duplex operation.

In another example, a field of WTRU IDs may be included in the B-RTS instead of (or in addition to) the WTRU bitmap field. The WTRU ID field may include IDs of WTRUs such as association IDs (AIDs), MAC addresses, or other type of IDs for WTRUs. In case of AIDs or other type of IDs, a WTRU may be able to identify whether it is being addressed given whether the basic service set ID (BSSID) of the AP is included in the B-RTS.

Additionally or alternatively, the B-RTS and/or B-CTS/NCTS may include an indicator indicating that the frame exchanges is to request or conduct NAV for a full-duplex TXOP.

B-RTS 1110 may include a frame control element 1111, a duration field 1112, a receiver address (RA) field 1113, a transmitter address (TA) field 1114, a WTRU Bitmap field 1115, and a frame control sequence (FCS) field 1116. The B-CTS/NCTS element 1120 may include a frame control field 1121, a duration field 1122, a receive address (RA) field 1123, and a frame control sequence (FCS) field 1124.

Figure 12:
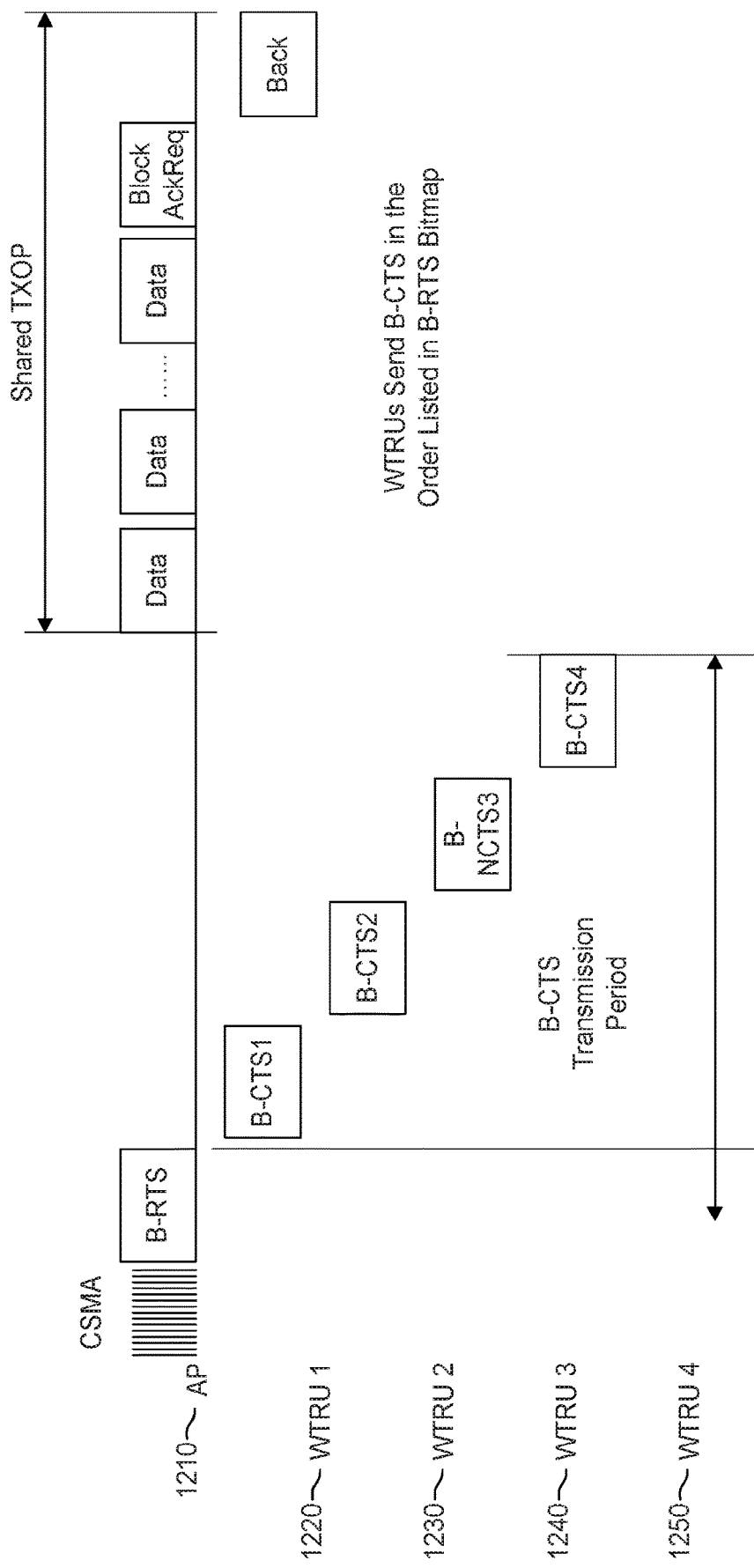
FIG. 12 is a diagram illustrating an example B-CTS response from stations.

FIG. 12 is a diagram illustrating an example B-CTS response from stations, which may be used in any combination of other embodiments described herein. As illustrated in FIG. 12, the AP 1210 may send a B-RTS frame to contend for a shared TXOP on a wireless medium. A bitmap control and/or a WTRU ID field may be used to identify the WTRUs within the group that are intended for the B-RTS message. The WTRUs which receive the B-RTS may send a B-CTS beginning with the WTRU at the beginning of the list identified in the B-RTS bitmap and/or WTRU ID fields. The B-RTS and/or B-CTS may contain an indicator indicating that the exchange is to request or reserve a NAV for a full-duplex TXOP.

The B-CTS transmission period may be coordinated by the AP 1210 with the WTRUs (1220, 1230, 1240, and 1250)

by a beacon configuration message for the timing of these transmissions to the WTRUs. If a WTRU is unable to reply due to interference caused by full-duplex operation, the WTRU may respond with a B-NCTS response during the B-CTS transmission period. The B-NCTS may include an indication of a reason for not transmitting a CTS frame. For example, the indication of a reason may indicate that the current medium is busy, the WTRU is current under NAV, and/or the like. The B-NCTS may also include the indication of NAV counter remaining at the WTRU. The transmitter of the B-RTS may wait and retransmit the B-RTS later (e.g., at a time at which the NAV counter should have expired).

Additionally or alternatively, if a WTRU has set its NAV timer after receiving a frame (e.g., a B-RTS, B-CTS and/or a B-NCTS) which may include an indication that the frame is used to reserve the medium for full-duplex TXOP and/or transmissions, the WTRU may ignore the frames that are received after the frame (e.g., a B-RTS, B-CTS and/or a B-NCTS is received). For example, it may wait until the end of the full-duplex TXOP and conduct normal medium access without waiting for a EIFS before accessing the medium, even if it cannot decode frames that may be transmitted in full-duplex fashion.

Although the embodiments described here consider Institute of Electrical and Electronics Engineers (IEEE) 802.11 specific protocols, it is understood that the embodiments described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
    receiving at least one first setup frame from an access point (AP), the at least one setup frame including information for use by another STA to transmit a measurement frame;
    receiving the measurement frame from the other STA;
    receiving a polling frame from the AP including an indication of a reporting phase; and
    transmitting feedback to the AP during the indicated reporting phase, wherein the feedback includes information based on the received measurement frame.

2. The method of claim 1, wherein the at least one setup frame includes a transmit opportunity (TxOP) setup frame.

3. The method of claim 1, wherein the at least one setup frame includes a discovery setup frame.

4. The method of claim 1 comprising receiving a trigger frame from the AP, the trigger frame including information for communication during a transmit opportunity (TxOP); and receiving, during the TxOP, downlink data from the AP.

5. The method of claim 1 comprising receiving a trigger frame from the AP, the trigger frame including information for communication during a transmit opportunity (TxOP); and transmitting, during the TxOP, uplink data to the AP.

6. The method of claim 1, wherein the at least one setup frame includes information for use by the STA to transmit another measurement frame, wherein the method comprises transmitting the another measurement frame.

7. The method of claim 6, wherein the transmitted measurement frame includes an indication of a transmit power used by the STA to transmit the first measurement frame.

8. The method of claim 1 comprising determining a compatibility of the other STA based on a received signal strength of the received second measurement frame.

9. The method of claim 8 comprising determining the compatibility of the other STA by comparing the received signal strength of the received second measurement frame with a threshold value.

10. The method of claim 9, wherein the feedback transmitted to the AP includes an indication of the compatibility of the other STA.

11. A station (STA) comprising:
    a processor and a transceiver configured to receive at least one first setup frame from an access point (AP), the at least one setup frame including information for use by another STA to transmit a measurement frame;
    the processor and the transceiver configured to receive the measurement frame from the other STA;
    the processor and the transceiver configured to receive a polling frame from the AP including an indication of a reporting phase; and
    the processor and the transceiver configured to transmit feedback to the AP during the indicated reporting phase, wherein the feedback includes information based on the received measurement frame.

12. The STA of claim 11, wherein the at least one setup frame includes a transmit opportunity (TxOP) setup frame.

13. The STA of claim 11, wherein the at least one setup frame includes a discovery setup frame.

14. The STA of claim 11, the processor and the transceiver configured to receive a trigger frame from the AP, the trigger frame including information for communication during a transmit opportunity (TxOP); and receiving, during the TxOP, downlink data from the AP.

15. The STA of claim 11, the processor and the transceiver configured to receive a trigger frame from the AP, the trigger frame including information for communication during a transmit opportunity (TxOP); and transmitting, during the TxOP, uplink data to the AP.

16. The STA of claim 11, wherein the at least one setup frame includes information for use by the STA to transmit another measurement frame, wherein the processor and the transceiver are configured to transmit the another measurement frame.

17. The STA of claim 16, wherein the transmitted measurement frame includes an indication of a transmit power used by the STA to transmit the first measurement frame.

18. The STA of claim 11, the processor and the transceiver configured to determine a compatibility of the other STA based on a received signal strength of the received second measurement frame.

19. The STA of claim 18, the processor and the transceiver configured to determine the compatibility of the other STA by comparing the received signal strength of the received second measurement frame with a threshold value.

20. The STA of claim 19, wherein the feedback transmitted to the AP includes an indication of the compatibility of the other STA.

\* \* \* \* \*